United States Patent
Tucker et al.

(10) Patent No.: US 7,195,841 B1
(45) Date of Patent: Mar. 27, 2007

(54) SYSTEM AND A METHOD OF SOLID STORAGE AND DISSOLUTION OF A CATHOLYTE FOR USE IN ELECTROCHEMICAL CELL

(75) Inventors: Steven P. Tucker, Portsmouth, RI (US); Maria G. Medeiros, Bristol, RI (US); Eric G. Dow, Barrington, RI (US)

(73) Assignee: The United States of America represented by the Secretary of the Navy, Washington, DC (US)

( * ) Notice: Subject to any disclaimer, the term of this patent is extended or adjusted under 35 U.S.C. 154(b) by 458 days.

(21) Appl. No.: 10/637,081

(22) Filed: Jan. 22, 2004

(51) Int. Cl.
*H01M 4/36* (2006.01)
*H01M 4/48* (2006.01)
*H01M 6/20* (2006.01)
*H01M 6/30* (2006.01)
*H01M 6/34* (2006.01)

(52) U.S. Cl. .................. 429/105; 429/110; 429/119; 429/101

(58) Field of Classification Search .............. 429/101, 429/27
See application file for complete search history.

(56) References Cited

U.S. PATENT DOCUMENTS

| 5,399,444 A | * | 3/1995 | Smith | 429/70 |
| 5,529,707 A | * | 6/1996 | Kejha | 252/62.2 |
| 6,849,356 B2 | * | 2/2005 | Dow et al. | 429/105 |

* cited by examiner

*Primary Examiner*—Dah-Wei Yuan
*Assistant Examiner*—Karie O'Neill
(74) *Attorney, Agent, or Firm*—James M. Kasischke; Jean-Paul A. Nasser; Michael P. Stanley

(57) ABSTRACT

A system and a method of storage and dissolution of solid catholyte are provided. The system and the method employ a solid medium having a controlled surface from which solid catholyte particles suspended within a matrix of encapsulating species are dissolved and hydrolyzed producing hydrogen peroxide to be used in semi fuel cells of undersea vehicles. Encapsulating species are also dissolved and hydrolyzed rendering products completely usable in the semi fuel cell. Sodium peroxide is preferably used as the solid catholyte and potassium superoxide and/or sodium hydroxide are preferably used as encapsulating species.

14 Claims, 1 Drawing Sheet

US 7,195,841 B1

SYSTEM AND A METHOD OF SOLID STORAGE AND DISSOLUTION OF A CATHOLYTE FOR USE IN ELECTROCHEMICAL CELL

STATEMENT OF GOVERNMENT INTEREST

The invention described herein may be manufactured and used by or for the Government of the United States of America for Governmental purposes without the payment of any royalty thereon or therefor.

BACKGROUND OF THE INVENTION (1) Field of the Invention

This invention relates to semi fuel electrochemical cells used for undersea vehicle propulsion. Specifically, this invention relates to a system and a method for solid storage and subsequent dissolution of electrolytes/catholytes used in semi fuel electrochemical cells used for undersea vehicle propulsion. More specifically, this invention relates to a system and a method for solid storage and subsequent dissolution of electrolytes/catholytes, wherein a solid medium is provided comprising electrolytes/catholytes in a solid form and includes sodium peroxide particles suspended in a matrix of potassium superoxide and/or sodium hydroxide, wherein the matrix controls the dissolution and hydrolysis rate of the solid catholyte by allowing for a dissolution only from a controlled surface of the solid medium, and wherein the matrix itself is dissolved and hydrolyzed and the products of this dissolution and hydrolysis are usable by the semi fuel cell.

(2) Description of the Prior Art

Primary batteries employing caustic electrolytes with hydrogen peroxide as the cathode species have been under development by the Navy and other laboratories since the 1980s. The aluminum-hydrogen peroxide semi fuel cells have applications in torpedoes, unmanned undersea vehicles ("UUVS") and other undersea craft that utilize electric energy. Emphasis has been placed on cost reduction in utilizing hydrogen peroxide as the cathode as opposed to earlier silver oxide cathodes. In order to achieve high energy storage densities it has been necessary to consider storing all reactants in concentrated form. Limiting factors in the development of the semi fuel cell systems, however, are the safety issues associated with liquid hydrogen peroxide and the total mass of hydrogen peroxide that would be required to be stored for a given mission.

Research has been conducted in an effort to avoid the problems related to liquid hydrogen peroxide as a catholyte. For example, use of oxygen as the cathode species employing an oxygen reduction cathode membrane has been investigated, developed and demonstrated for use undersea (with bottled oxygen or oxygen candles) and on land (using air as the oxygen source). However, there is a need for higher energy densities than those that have been achieved by these methods. Additionally, as with concentrated hydrogen peroxide, there are also safety concerns associated with each of these systems.

Other forms of concentrated catholyte for fuel cell systems that have been investigated for high energy storage densities are catholytes delivered to catholyte solutions from solid form, for example, powders or pellets. However, these forms for delivering catholytes render control of the dissolution rate of the solid catholyte composition into the aqueous electrolyte difficult. Although catholyte rate delivery can be attained, to some degree, by adjusting the geometrical size and shape of the catholyte composition, the degree of control is too imprecise to properly control the dissolution of the catholyte when its shape and size varies during its lifetime. A related problem is posed by dissolution rate sensitivity of solid catholytes to the flow rate of the catholyte solution.

Attempts to solve the problems associated with solid electrolytes and the control of their dissolution and hydrolysis have been made. For example, U.S. Pat. No. 5,399,444 to Smith discloses a device that operates based on the stated discovery that the concentration of an electrolyte in solution can be maintained even when the electrolyte is being consumed continuously or intermittently by utilizing an electrolyte delivery system based upon internal osmotic pressure. The device employs salts as solid electrolytes, for example sea salt and zinc chloride, or bases such as lithium hydroxide, sodium hydroxide, and potassium hydroxide or mixtures thereof. Particles of electrolytes are coated with a semi-permeable coating. Water is imbibed through the coating and dissolves the water-soluble electrolyte, thereby creating an osmotic pressure that causes the saturated solution of the electrolyte to be pumped out the micro-passageways in the film coating. By adjusting the relative amount of electrolyte solution to solid electrolyte in the delivery, one can maintain the concentration of the electrolyte in solution relatively constant during the use of the electrolyte solution in an electrochemical apparatus.

U.S. Pat. No. 5,529,707 to Kejha discloses solid composite polymeric electrolytes that are made by mixing alkali metal trifluoromethanesulfonate and polyethylene oxide to which mixtures of lightweight non-conductive inorganic fillers such as oxides or peroxides of lithium, magnesium, and sodium have been added with co-solvents of esters and ethers. Solidification of the electrolyte is achieved by the presence of the alkali metal trifluoromethanesulfonate and by partial evaporation of the lower boiling point ether or ester. These electrolytes can be used as solid, semi-solid or liquid state polymer electrolytes for batteries and other electrochemical devices.

None of the above prior art address the problems related to catholytes where the cathode species is hydrogen peroxide obtained by dissolution of caustic oxides, peroxides, or superoxides and which are an alternative to liquid hydrogen peroxide and provide the required high energy densities for semi fuel cells in underwater vehicles. Thus, powdered or crystalline forms of these peroxides, oxides, and superoxides dissolve rapidly in water with an exothermic reaction. It is necessary to control the hydrolysis rate of these solid catholytes to avoid decomposition of hydrogen peroxide as the heat that is generated during the hydrolysis destabilizes hydrogen peroxide before it reaches the fuel cell.

Consequently there is a need in the art for an inexpensive system and method that utilizes solid catholytes such as oxides, peroxides and superoxides of alkaline metals in which the rate of hydrolysis is controlled to limit the production of cathode species ($H_2O_2$) to the rate at which they are consumed in the semi fuel cell.

SUMMARY OF THE INVENTION

The object of this invention is to provide an inexpensive system and method that does not pose high safety risks related to the storage of liquid hydrogen peroxide by utilizing solid catholytes such as oxides, peroxides, and superoxides of alkaline metals and which provides for a controlled rate of catholyte hydrolysis to limit the production of cathode species ($H_2O_2$) to the rate at which they are consumed in a semi fuel cell.

In accordance with this invention there is provided a solid medium for storing a solid catholyte wherein catholyte particles are suspended within a matrix of encapsulating species. Specifically, there is provided a solid medium for storing a solid catholyte wherein catholyte particles are selected from oxides, superoxides and peroxides of alkaline metals and the encapsulating species are selected from oxides, superoxides, and peroxides of alkaline metals and sodium hydroxide. Preferably, the solid medium comprises sodium peroxide ($Na_2O_2$) as catholyte particles encapsulated in a matrix of potassium superoxide and/or sodium hydroxide ($KO_2$ and/or $NaOH$). The solid medium includes a controlled surface where hydrolysis resulting in products that include hydrogen peroxide, is to occur.

In accordance with this invention there is also provided a high energy density system including a solid medium comprising catholyte particles suspended within the encapsulating species, wherein the rate of dissolution and hydrolysis of the solid catholyte is controlled by the encapsulating species by allowing for dissolution and hydrolysis to occur only on a controlled surface of the medium, wherein the encapsulating species is dissolved and hydrolyzed and used up for the operation of a fuel cell, and wherein products of hydrolysis of catholyte particles and encapsulating species include hydrogen peroxide.

In accordance with this invention there is also provided a high energy density system including a solid medium comprising sodium peroxide particles, as a solid catholyte particles, suspended within the matrix of potassium superoxide and/or sodium hydroxide, wherein the rate of dissolution and hydrolysis of the solid catholyte is controlled by the encapsulating species of the matrix in that the encapsulating species creates a controlled surface of the solid medium and the dissolution and hydrolysis occur only on the controlled surface of the medium, wherein the encapsulating species is dissolved and hydrolyzed and used up for the operation of a fuel cell, and wherein products of hydrolysis of catholyte particles and encapsulating species include hydrogen peroxide.

In accordance with this invention there is further provided a method of making a catholyte solution comprising hydrogen peroxide, including the steps of fabricating a solid medium comprising catholyte particles suspended within a matrix of encapsulating species, wherein the solid medium has a controlled surface, dissolution of the solid catholyte and encapsulating species in a liquid circulating across the controlled surface of the medium, wherein said matrix controls the rate of the dissolution and hydrolysis of the solid catholyte by allowing for dissolution and hydrolysis to occur only on controlled surface of the solid medium, recirculating and cooling the liquid that remained after the necessary amount of the liquid was drawn off for the operation of the fuel cell, and introducing seawater to the remaining liquid to make up for the part of the liquid that was drawn off.

In accordance with this invention there is further provided a method of making a catholyte solution comprising hydrogen peroxide, including the steps of fabricating a solid medium comprising sodium peroxide particles as a solid catholyte suspended within a matrix of potassium superoxide and/or sodium hydroxide, wherein the solid medium has a controlled surface, dissolution of the solid catholyte and encapsulating species in a liquid circulating across the controlled surface of the medium, wherein said matrix of potassium superoxide and/or sodium hydroxide controls the rate of the dissolution and hydrolysis of the solid catholyte by allowing for dissolution to occur only on the controlled surface of said medium, recirculating and cooling the liquid that remained after the necessary amount of the liquid was drawn off for the operation of the fuel cell, and introducing seawater to the remaining liquid to make up for the part of the liquid that was drawn off.

These and other features of the present invention will become apparent from the following detailed description when taken in conjunction with the accompanying drawings.

DESCRIPTION OF THE PREFERRED EMBODIMENT

This invention provides a system and a method of storage of a solid catholyte, wherein the solid catholyte is stored in a solid medium, and a subsequent dissolution and hydrolysis of the catholyte for use in electrochemical cells that are used in torpedoes, UUVs, and other undersea vehicles.

The present invention lies in the reactions of oxides, peroxides, and superoxides of alkaline metals with water and their hydrolysis to produce hydroxides, hydrogen peroxide, and oxygen, depending on the chemical compound used for hydrolysis. Hydrogen peroxide is the cathode species used in semi fuel cells in undersea vehicles. This system and method provide for hydrogen peroxide as a cathode species avoiding, however, high safety risks associated with storing and the transportation of liquid hydrogen peroxide.

The hydrolysis reactions of potassium superoxide and sodium peroxide yield the hydrogen peroxide necessary for operation of aluminum-hydrogen peroxide semi fuel cell from a dry storage form. These reactions are as follows:

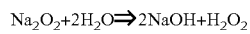

Figure 1:
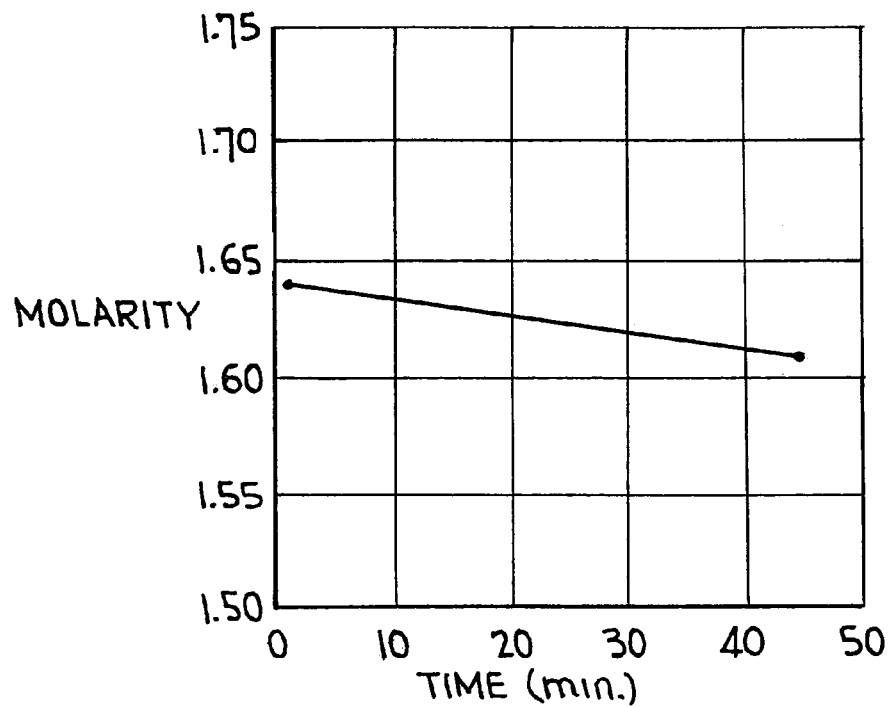
FIG. 1 shows graphically the short term stability of hydrogen peroxide.

The powdered or crystalline form of sodium peroxide and potassium superoxide lends itself to rapid dissolution with an exothermic reaction. The heat that is generated during the hydrolysis is detrimental to the stability of hydrogen peroxide formed during the reaction. FIG. 1 shows results of a hydrogen peroxide concentration test where 4% per hour decomposition rate of unstabilized hydrogen peroxide was observed.

Although drop in hydrogen peroxide concentration would not present a problem in short torpedo type missions, it would reduce system energy density in applications of long duration. It is necessary then to control the hydrolysis rate of the dry catholyte to limit its production to the rate at which it is consumed in the semi fuel cell.

According to the present invention, the rate of dissolution of a solid catholyte can be limited by providing a solid cake of reactant species where the hydrolysis is allowed to occur on a specific controlled surface instead of over the entire surface of multiple fine particles of the catholyte. As the alkaline metal oxides lack thermal stability, the process of casting a solid cake is not possible for most of the oxides. However, a solid cake can be formed as a solid medium comprising solid catholyte particles suspended within a matrix of encapsulating species when the encapsulated species have melting temperatures below the thermal decomposition temperature of the solid catholyte.

Accordingly, a solid medium of this invention includes, in addition to a solid catholyte, an encapsulating species to enable formation of a stable entity and at the same time to control dissolution of the solid catholyte from a controlled surface of the solid medium into a working liquid catholyte by flow of the catholyte over the controlled surface. The encapsulating species limits the access of the hydrolyzing liquid to catholyte particles present on the controlled surface only. The controlled surface is that portion of the solid medium where the hydrolysis actually occurs.

Solid catholyte for the solid medium of this invention is selected from alkaline metal oxides, superoxides, and peroxides and the encapsulating species is selected from alkaline metal oxides, superoxides, and peroxides and sodium hydroxide such that the melting temperature of the encapsulating species is below the thermal decomposition temperature of the solid catholyte. Preferably the solid catholyte is sodium peroxide particles and the encapsulating species is a matrix of potassium superoxide and/or sodium hydroxide. The preferred particle size of the sodium peroxide ranges from 0.03" to 0.12". The preferred amount of the sodium peroxide in the solid medium is about 65–75% by weight.

Figure 2:
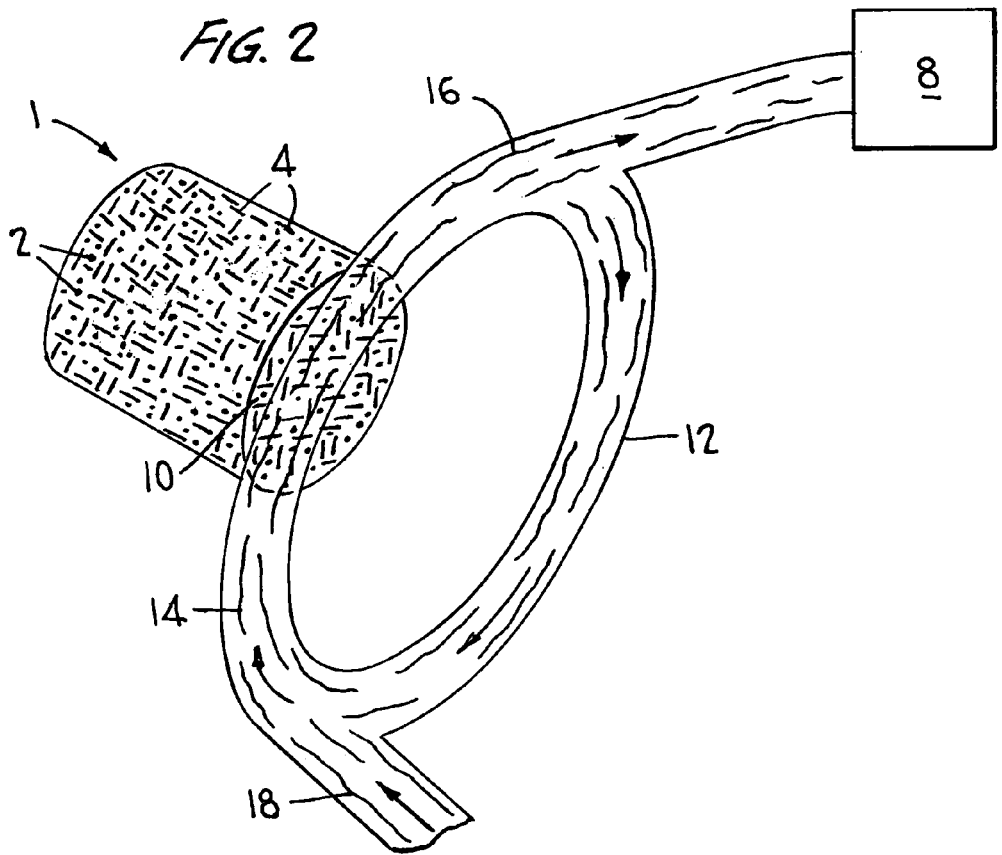
FIG. 2 is a schematic illustration of the system of this invention.

FIG. 2 shows a preferred embodiment of this invention. This embodiment provides for a system of storage and subsequent dissolution of a solid catholyte. It includes a solid medium comprising sodium peroxide particles suspended within a matrix of potassium superoxide and/or sodium hydroxide. This solid medium provides completely consumable materials for a semi fuel cell as the encapsulating species (potassium superoxide and/or sodium hydroxide) are also useful in the operation of the fuel cell and are used up in the cell in addition to the products of hydrolysis of the solid catholyte.

In FIG. 2, dissolution of solid medium 1 and, at the same time, solid catholyte particles 2 and encapsulating species 4 is accomplished by ablation of solid medium 1 from controlled surface 10. Liquid supply 14 that is a water solution of the products resulting from the hydrolysis of solid catholyte particles 2 and encapsulating species 4 is circulated across the controlled surface 10 of medium 1 to dissolve and hydrolyze solid catholyte and encapsulating species and produce hydrogen peroxide while other products are also produced depending on the specific chemical composition of the solid medium. While some of liquid working catholyte 16 is drawn off for use in semi fuel cell 8, the remaining liquid working catholyte 16 is recirculated and cooled through recirculation loop 12 to reduce the heat build up resulting from the process of hydrolysis. As a portion of liquid working catholyte 16 is drawn off for use by semi fuel cell 8, seawater supply 18 is introduced to recirculating loop 12 to make up additional solution. Various cooling means for recirculating loop 12, such as tube in tube, tube and shell heat exchanger, or heat exchanger integrated to the underwater vehicle hull, and various means for introducing seawater to recirculating loop 12, such as pumps and valves, can be used with the present invention.

This system and method have several advantages. The solid medium provides for high system energy density, increases shelf life, and provides for low cost in long term storage of the concentrated solid catholyte without the safety risks that are associated with the storage of liquid hydrogen peroxide. As both the solid catholyte and the encapsulating species are used for the operation of the aluminum-hydrogen peroxide semi fuel cell, a savings of over 40% in electrolyte/catholyte species weight that needs to be stored onboard an undersea vehicle is possible when using the system of this invention, as compared to 50% hydrogen peroxide and 50% sodium hydroxide solutions. This system and method allows for a smaller size of an energy system or longer mission duration within the same weight allocation. The materials used as a solid catholyte and encapsulating species are staple items of commerce and do not require further expensive development costs.

The additional advantage of this system and method is that transportation restrictions associated with liquid hydrogen peroxide are avoided. The air shipment of alkaline metal oxides is permitted within certain parameters while concentrated hydrogen peroxide cannot be shipped. This allows for the use of this system and method at remote sites where air transportation is the only reasonable method of delivering material.

In addition to the Navy applications of this invention in torpedoes, UUVs, etc., there exist numerous possible commercial applications of this invention, for example, in the area of undersea exploration such as deep sea search, rescue, and discovery and oil platform surveillance as well as applications in physical oceanography, for example, in remote water sampling.

While the present invention has been described with respect to the preferred embodiments thereof, it will be understood by those of ordinary skill in the art that many variations and modifications can be effected within the scope and spirit of this invention.

What is claimed is:

1. A system for storing a solid catholyte that is dissolved in a water solution to create hydrogen peroxide through hydrolysis for use in a semi fuel electrochemical cells used for undersea vehicle propulsion, comprising:
   a solid medium including catholyte particles suspended within a matrix of encapsulating species, said solid medium having a controlled surface; and
   a liquid water solution circulating across said controlled surface;
   wherein said catholyte particles and said encapsulating species are dissolved upon contact of said liquid water solution with said controlled surface, resulting in hydrolysis and the products of hydrolysis include hydrogen peroxide.

2. A system according to claim 1 wherein said catholyte particles are selected from the group consisting of oxides, peroxides, and superoxides of alkaline metals and said encapsulating species are selected from the group consisting of oxides, peroxides, and superoxides of alkaline metals and sodium hydroxide.

3. A system according to claim 1 wherein said catholyte particles are sodium peroxide particles.

4. A system according to claim 3 wherein the particle size of sodium peroxide ranges from 0.03" to 0.12".

5. A system according to claim 3 wherein the amount of sodium peroxide in said solid medium is about 65–75% by weight.

6. A system according to claim 1 wherein said catholyte particles are sodium peroxide particles and said encapsulating species are selected from the group consisting of potassium superoxide and sodium hydroxide, and wherein the particle size of sodium peroxide ranges from 0.03" to 0.12", and the amount of sodium peroxide in said solid medium is about 65–75% by weight.

7. A system according to claim 2 further comprising a means for recirculating and cooling of said liquid water solution.

8. A system according to claim 7 further comprising a means for introducing seawater to said recirculating means.

9. A solid medium, comprising:
a matrix of encapsulating species;
catholyte particles suspended within said matrix of encapsulating species; and
a controlled surface;
wherein upon hydrolysis said matrix of encapsulating species and said catholyte particles dissolve from said controlled surface and the products of hydrolysis include hydrogen peroxide.

10. A solid medium according to claim 9 wherein said catholyte particles are selected from the group consisting of oxides, peroxides, and superoxides of alkaline metals and said encapsulating species are selected from the group consisting of oxides, peroxides, and superoxides of alkaline metals and sodium hydroxide.

11. A solid medium according to claim 1, wherein said solid catholyte particles are sodium peroxide particles.

12. A solid medium according to claim 11 wherein the particle size of sodium peroxide ranges from 0.03" to 0.12".

13. A solid medium according to claim 11 wherein the amount of sodium peroxide is about 65–75% by weight.

14. A solid medium according to claim 9 wherein said catholyte particles are sodium peroxide particles and said encapsulating species are selected from the group consisting of potassium superoxide and sodium hydroxide, and wherein the particle size of sodium peroxide ranges from 0.03" to 0.12", and the amount of sodium peroxide in said solid medium is about 65–75% by weight.

* * * * *